United States Patent [19]

Boy et al.

[11] Patent Number: 4,831,485

[45] Date of Patent: May 16, 1989

[54] GAS DISCHARGE OVERVOLTAGE ARRESTER

[75] Inventors: Juergen Boy; Ernst L. Hoene, both of Berlin, Fed. Rep. of Germany

[73] Assignee: Siemens Aktiengesellschaft, Berlin and Munich, Fed. Rep. of Germany

[21] Appl. No.: 198,589

[22] Filed: May 23, 1988

Related U.S. Application Data

[63] Continuation of Ser. No. 38,497, Apr. 15, 1987, abandoned.

[30] Foreign Application Priority Data

Apr. 22, 1986 [DE] Fed. Rep. of Germany ....... 3613582

[51] Int. Cl.$^4$ ................ H02H 3/22

[52] U.S. Cl. ................ 361/120; 361/130; 361/117; 313/345

[58] Field of Search ............... 361/117, 120, 122, 129, 361/130; 313/345, 346 R, 355, 625, 630, 635

[56] References Cited

U.S. PATENT DOCUMENTS

| | | | |
|---|---|---|---|
| 2,757,308 | 7/1956 | Katzberg | 313/345 |
| 3,676,743 | 7/1972 | Bahr et al. | 361/120 |
| 3,691,428 | 9/1972 | Bahr et al. | 361/120 |
| 3,876,894 | 4/1975 | Peche | 361/120 X |
| 4,015,172 | 3/1977 | Peche et al. | 361/129 |
| 4,079,164 | 3/1978 | Misumi | 313/345 X |
| 4,084,208 | 4/1978 | Bazarian et al. | 361/129 X |
| 4,104,693 | 8/1978 | Toda et al. | 361/120 |
| 4,433,354 | 2/1984 | Large et al. | 361/120 |
| 4,493,004 | 1/1985 | Large et al. | 361/129 X |
| 4,553,063 | 11/1985 | Geibig et al. | 313/355 X |

FOREIGN PATENT DOCUMENTS 2619866 5/1976 Fed. Rep. of Germany .

*Primary Examiner*—M. H. Paschall
*Assistant Examiner*—A. Jonathan Wysocki
*Attorney, Agent, or Firm*—Hill, Van Santen, Steadman & Simpson

[57] ABSTRACT

An overvoltage arrester for high surge currents having an increased useful life while maintaining suitable electrical properties comprising a pair of electrodes secured to an insulator housing in confronting, spaced relation to provide a discharge gap, the electrodes being covered with a metallic activation compound comprising metallic barium aluminum dispersed in a matrix of metallic aluminum, the matrix being fused onto the confronting surfaces. Additional metal additives may be embedded or alloyed with the metals of the activation layer.

3 Claims, 1 Drawing Sheet

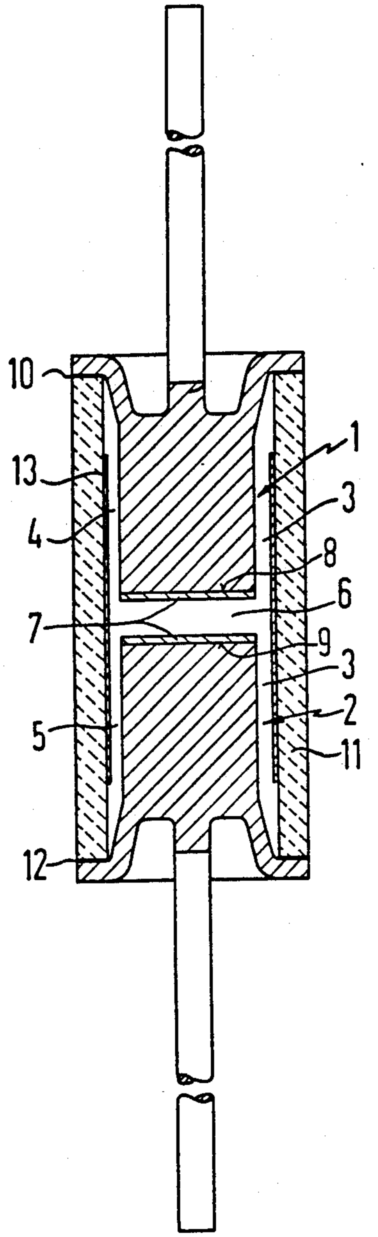
10
13
4
7
5
12
1
3
8
6
9
3
2
11

GAS DISCHARGE OVERVOLTAGE ARRESTER

This is a continuation of application Ser. No. 038,497, filed Apr. 15, 1987, now abandoned.

BACKGROUND OF THE INVENTION

1. Field of the Invention

The present invention is in the field of overvoltage arresters of the type in which electrodes are soldered into an insulator housing to provide a discharge gap between them. The electrodes are coated wtih a metallic activation compound at the confronting surfaces, the actvation layer including metallic barium aluminum and a matrix of metallic aluminum.

2. Description of the Prior Art

An overvoltage arrester of the type with which the present invention is concerned is disclosed in German Pat. No. 2619886. In that patent, there is disclosed an overvoltage arrester comprising an activation layer of barium aluminum and it was proposed that metallic titanium be introduced into the activator layer for stabilizing the response voltage at high current loads and for increasing the useful life while retaining unaltered electrical properties. It has been demonstrated, however, that a change in the response voltage occurs with a high number of switching events and with a high surge current load.

SUMMARY OF THE INVENTION

The present invention provides an improvement in the useful life and in the surge current carrying capability of an overvoltage arrester while retaining the other electrical properties in unaltered form. In the past, individual particles were stripped from the activation layer under high and frequent load conditions so the electrical properties of the arrester were changed.

In accordance with the present invention, we provide a gas discharge overvoltage arrester which includes an insulator housing, a pair of electrodes secured to the housing in confronting, spaced relation to provide a discharge gap therebetween, and a metallic activation compound on the confronting surfaces of the electrodes. The activation compound comprises metallic barium aluminum dispersed in a matrix of metallic aluminum, the matrix being fused onto the confronting surfaces of the electrodes. The improved activation compound layer of the present invention adheres very firmly to the electrodes and is reliably cohesive since the barium aluminum alloys with and securely bonds to the molten aluminum.

In one embodiment of the present invention, one or more metal additives are included in the aluminum matrix. Suitable metal additives are metals such as Ni, Mo, Cu, Ag, Cr or Zr.

The proportion of molten aluminum in the matrix is preferably between 10 and 40 weight percent of the metallic activation compound. The layer evidences a good coherency in this range. With high aluminum concentrations, there is a tendency for the aluminum to form small balls when melted and thus roughen the electrode surface in an undesirable way to reduce the response voltage.

In a preferred form of the invention, the overvoltage arrester of the present invention comprises electrodes that are composed of copper at least in the region of the electrode surface. The overvoltage arrester is soldered to the locations between the insulator housing and the electrodes by means of a copper-silver eutectic solder. In this embodiment, an alloy zone is produced between the activator layer and the electrode surface so that adhesion is secured in a particularly durable way.

BRIEF DESCRIPTION OF THE DRAWINGS

The single FIGURE of the drawing is a cross-sectional view of an overvoltage arrester produced according to the present invention.

DESCRIPTION OF THE PREFERRED EMBODIMENTS

Two electrodes 1 and 2 are shown projecting into a ceramic housing 11. They form narrow gaps 3 with the ceramic housing 11, the narrow gaps constituting low evaporation rear spaces 4 and 5. Starting strips 13 extend from a discharge gap 6 located between the two confronting electrodes 1 and 2 into the gaps 3 and the low evaporation rear spaces 4 and 5. The electrodes 1 and 2 are soldered vacuum-tight to the ceramic housing 11 with solder deposits 10 and 12. A copper-silver eutectic solder is the preferred solder material.

Electrode surfaces 8 and 9 of the electrodes 1 and 2 are covered with activator layers 7. These layers are composed of metallic aluminum which is fused onto the electrodes 1 and 2 and further contains particles of barium aluminum (a compound containing equimolar amounts of barium and aluminum). The aluminum matrix may further contain one or more additives from the group Ni, Mo, Cu, Ag, Cr or Zr which are embedded therein to the extent of not more than 40 weight percent of the activation compound.

Barium aluminum is an alloy which melts at about 1150° C. and only slightly dissolves in aluminum at temperatures up to about 900° C. It can not fuse with the suroundling aluminum. The metallic additives serve the purpose of minimizing the aluminum quantity in that they act as filler materials and simultaneously reduce the aluminum vapor pressure during the discharge through the gas due to alloy formation. Some of the additives such as Mo, Cr and Zr also exhibit getter properties.

In a preferred form of preparing the composition of the present invention, the components of the activation layer are mixed in powder form and are then applied to the electrodes. The electrodes are then inserted into the insulator housing and are soldered to the housing at a temperature range of about 700° to 900° C.

It will be evident that various modifications can be made to the described embodiments without departing from the scope of the present invention.

We claim as our invention

1. A gas discharge overvoltage arrester comprising:

an insulator housing, a pair of electrodes secured to said housing in confronting spaced relation to provide a discharge gap therebetween, and an activation compound on the confronting surfaces of said electrodes, said activation compound comprising particles of an alloy of barium and aluminum uniformly dispersed in a matrix of metallic aluminum, said matrix being fused onto said confronting surfaces, the metallic aluminum constituting 10 to 40 weight percent of said activation compound.

2. An arrester according to claim 1 wherein said activation compound also contains at least one additional metal selected from the group consisting of Ni, Mo, Cu, Ag, Cr, and Zr, said additional metal being present in an amount of up to 40% by weight of said activation compound.

3. A method for the manufacture of a gas discharge overvoltage arrester which comprises:

combining powdered metallic aluminum with a powdered alloy of barium and aluminum to form a mixture, applying said mixture to a pair of electrodes, inserting said electrodes into an insulator housing, and soldering said electrodes in spaced relation to said housing at a temperature of from 700° to 900° C.

* * * * *